(12) United States Patent
Abbott, III et al.

(10) Patent No.: US 9,031,813 B2
(45) Date of Patent: May 12, 2015

(54) METHODS AND APPARATUS FOR ESTIMATING GRAVITY-FREE SHAPES

(75) Inventors: John Steele Abbott, III, Elmira, NY (US); Daniel R Harvey, Bath, NY (US); Correy Robert Ustanik, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 701 days.

(21) Appl. No.: 12/870,134

(22) Filed: Aug. 27, 2010

(65) Prior Publication Data

US 2012/0053891 A1    Mar. 1, 2012

(51) Int. Cl.
| G01B 7/00 | (2006.01) |
| G01B 15/00 | (2006.01) |
| G01B 5/20 | (2006.01) |
| G01G 9/00 | (2006.01) |
| G01B 11/06 | (2006.01) |
| G01B 5/00 | (2006.01) |

(52) U.S. Cl.
CPC .......... *G01B 11/0608* (2013.01); *G01B 5/0004* (2013.01); *G01B 5/0016* (2013.01)

(58) Field of Classification Search
CPC ......... G01B 11/24; G01B 21/20; G01G 19/40
USPC ......................................... 702/155, 167, 173
See application file for complete search history.

(56) References Cited

U.S. PATENT DOCUMENTS

| 7,509,218 B2 | 3/2009 | Hoysan et al. ................. 702/41 |
| 2003/0229415 A1* | 12/2003 | Andersen et al. ............. 700/176 |
| 2007/0028681 A1* | 2/2007 | Goforth et al. ................. 73/159 |
| 2008/0120044 A1* | 5/2008 | Hoysan .......................... 702/41 |

FOREIGN PATENT DOCUMENTS

WO     WO 2009/108302    *  9/2009

OTHER PUBLICATIONS

Abbott, J.S., "Modal Excitation of Optical Fibers: Estimating the Modal Power Distribution,"1998. (http://grouper.ieee.org/groups/802/3/aq/public/upload/mpd_15jun.pdf).
Abbott, J.S., "Light Propagation in Gbit LANS," 1999. (www.ima.umn.edu/talks/workshops/9-9-10.99/abbott/abbott.ppt).

(Continued)

*Primary Examiner* — Michael Nghiem
(74) *Attorney, Agent, or Firm* — Matthew J. Mason; Maurice M. Klee; Thomas R. Beall (57) ABSTRACT

Methods and apparatus (100,200) for estimating the gravity-free shape of a flexible object (140) such as a thin sheet of glass are provided. In certain embodiments, an estimate of the gravity-free shape is produced using a bed-of-nails (BON) gauge (100) and then the shape is measured at a higher spatial resolution using a second gauge (200), with the theoretical sag between the pins (110) of the BON gauge being subtracted from the shape measured by the second gauge. In other embodiments, shape measurements are performed on both sides of the object (140) and used to estimate the reliability of the gravity-free shape estimate. In further embodiments, the bed-of-nails gauge (100) uses a least squares minimization procedure in adjusting the heights of the pins (110).

4 Claims, 11 Drawing Sheets

(56) References Cited

OTHER PUBLICATIONS

Golowich et al.,"A New Modal Power Distribution Measurement for High-Speed Short-Reach Optical Systems", Journal of Lightwave Technology vol. 22 No. 2 Feb. 2004 pp. 457-468.

Kuroki, H., Kobyakov, A., Meda, G., "Analytical Approach to Evaluate Maximum Gravitational Sag and its Variations of Glass Substrate for LCD", paper in 2004 SID International Symposium Digests of Technical Papers.

Press et al., Numerical Recipes: The Art of Scientific Programming, Cambridge Univ. Press 1986, Chapter 2.9 Singular Value Decomposition.

Schad, M.J., "Estimation and Control of Glass Sag in Large-Size Flat-Panel Manufacturing", paper at 1995 SID Display Manufacturing Technology Conference, Santa Clara, CA Jan. 31-Feb. 2, 1995.

Dierckx, P., Curve and Surface Fitting with Splines, Oxford Univ. Press 1995, p. 49 equation (3.10).

* cited by examiner

| -0.14 | -0.24 | -0.48 | -0.22 | 0.1 | -0.27 | 0.5 | -0.35 | 0.26 |
|---|---|---|---|---|---|---|---|---|
| -0.32 | 0.82 | 0.39 | 0.6 | -0.07 | 1.99 | -0.02 | -0.52 | -0.1 |
| -0.4 | 0.99 | -0.85 | 0.28 | -0.45 | 0.29 | -0.1 | -0.28 | 0.3 |
| -0.32 | 0.65 | 0.07 | 0.06 | 0.26 | 0.1 | 0.75 | -0.14 | 0.08 |
| 0.04 | 0.01 | -0.05 | -0.5 | -0.14 | -0.57 | -0.03 | -0.09 | 0.12 |
| 0.2 | -0.58 | 0.55 | -0.25 | -0.13 | 0.2 | 0.21 | 4.87 | -0.18 |
| 0.47 | -1.79 | -6.51 | 0.11 | 0.5 | -0.5 | 0.34 | 0.24 | 0.02 |
| 0.11 | 0.13 | 0.52 | -0.48 | 0.3 | -0.51 | 0.38 | -0.41 | 0.11 |
| 0.11 | 0.01 | 0.07 | -0.1 | -0.15 | 0.33 | -0.39 | 0.32 | -0.09 |

FIG. 12

| -0.25 | -0.11 | -0.24 | 0.11 | 0.05 | 0.17 | 0.2 | 0.31 | 0.42 |
|---|---|---|---|---|---|---|---|---|
| -0.2 | -0.18 | 0.03 | 0.01 | 0.1 | 0.16 | 0.23 | 0.34 | 0.34 |
| -0.34 | -0.06 | -0.13 | -0.16 | 0.07 | 0.08 | 0.27 | 0.19 | 0.38 |
| -0.32 | -0.21 | -0.19 | 0.02 | 0.1 | 0 | 0.14 | 0.31 | 0.31 |
| -0.3 | -0.17 | -0.11 | -0.05 | -0.14 | 0.38 | 0.14 | 0.18 | 0.35 |
| -0.33 | -0.31 | -0.15 | -0.19 | 0.02 | -0.06 | 0.03 | 0.19 | 0.27 |
| -0.32 | -0.34 | -0.2 | -0.07 | 0 | -0.05 | 0.21 | 0.2 | 0.26 |
| -0.41 | -0.22 | -0.32 | -0.19 | 0.08 | 0.01 | 0.1 | 0.12 | 0.27 |
| -0.37 | -0.37 | -0.2 | -0.12 | -0.2 | 0.05 | -0.08 | 0.25 | 0.19 |

METHODS AND APPARATUS FOR ESTIMATING GRAVITY-FREE SHAPES

FIELD

This disclosure relates to methods and apparatus for estimating the gravity-free shape of a flexible object such as a thin sheet of glass of the type used in display devices, e.g., liquid crystal displays (LCDs).

BACKGROUND

Knowledge of the gravity-free shape of a flexible object such as a glass sheet is of value in terms of understanding and controlling 1) the process used to make the object, e.g., a downdraw fusion process in the case of glass sheets, and 2) the behavior of the object during use, e.g., the behavior of a glass sheet when vacuum chucked to a flat plane. See, for example, commonly-assigned U.S. Pat. No. 7,509,218 and PCT Patent Publication No. WO 2009/108302, the contents of both of which are incorporated herein by reference in their entireties.

Determining the gravity-free shape of glass sheets used as substrates in display devices has become particularly challenging as the sheets have become larger and thinner. For example, GEN 10 substrates for liquid crystal displays have an area of greater than nine square meters (2,880×3,130 mm) and a thickness of 0.7 mm, with even thinner sheets becoming ever more popular. Although the "bed-of-nails" (BON) techniques of U.S. Pat. No. 7,509,218 can be used with such larger and thinner sheets, the number of measuring assemblies (i.e., the number of adjustable pin and load cell combinations) needed to achieve high resolution becomes substantial as the glass sheet becomes larger. This, in turn, leads to high equipment costs. Also, errors due to a defective measuring assembly become more common as the number of assemblies increases. Further, the preferred algorithm of U.S. Pat. No. 7,509,218 for adjusting the heights of the adjustable pins fixes the locations of three of the pins. In practice, such fixed heights cause shape errors to concentrate at the locations of the sheet supported by the fixed-height pins, which may compromise the accuracy of the shape determination.

The present disclosure provides 1) methods and apparatus for achieving higher resolution for a given number of measuring assemblies, 2) methods and apparatus for confirming the reliability of shape determinations, and 3) methods and apparatus for distributing shape errors over an entire set of adjustable-pin/load-cell assemblies. These features can be used singly or in combinations, and thus can be used to address some or all of the above problems relating to the determination of gravity-free shapes using BON techniques.

SUMMARY

In accordance with a first aspect, a method for obtaining an estimate of the gravity-free shape of a flexible object (140) is disclosed which includes:
(I) supporting the flexible object (140) on a plurality of height adjustable pins (110);
(II) adjusting the heights of the adjustable pins (110) by iteratively:
 (A) measuring the weight (112) of the flexible object (140) at each pin (110); and
 (B) adjusting the heights (114) of the pins (110) based on the measured weights;
(III) terminating the iteration of step (II) when the number of iterations, the measured weights, and/or the changes in the heights satisfy one or more predetermined criteria;
(IV) without removing the flexible object (140) from the pins (110), measuring the flexible object's shape after step (III) using a measuring system (200) having a finer spatial resolution than the smallest spacing between any two pins (110); and
(V) subtracting a calculated shape for a flat object supported on the pins from the measured shape of step (IV), the flat object having the same dimensions and mechanical properties as the flexible object (140) and the resulting difference being an estimate of the gravity-free shape of the flexible object (140).

In accordance with a second aspect, a method is disclosed for obtaining an estimate of the gravity-free shape of a flexible object (140), the flexible object (140) having opposing first and second surfaces, the method including:
(I) supporting the first surface of the flexible object (140) on a plurality of height adjustable pins (110);
(II) adjusting the heights (114) of the adjustable pins (110) by iteratively:
 (A) measuring the weight (112) of the flexible object (140) at each pin (110); and
 (B) adjusting the heights (114) of the pins (110) based on the measured weights;
(III) terminating the iteration of step (II) when the number of iterations, the measured weights, and/or the changes in height satisfy one or more predetermined criteria;
(IV) without removing the flexible object (140) from the pins (110), measuring the flexible object's shape after step (III) using a measuring system (200) having a finer spatial resolution than the smallest spacing between any two pins (110);
(V) supporting the second surface of the flexible object (140) on the plurality of height adjustable pins (110);
(VI) adjusting the heights (114) of the adjustable pins (110) by iteratively:
 (A) measuring the weight (112) of the flexible object (140) at each pin (110); and
 (B) adjusting the heights (114) of the pins (110) based on the measured weights;
(VII) terminating the iteration of step (VI) when the number of iterations, the measured weights, and/or the changes in height satisfy one or more predetermined criteria;
(VIII) without removing the flexible object (140) from the pins (110), measuring the flexible object's shape after step (VII) using a measuring system (200) having a finer spatial resolution than the smallest spacing between any two pins;
(IX) aligning the measurement data of steps (IV) and (VIII) based on physical locations on the flexible object (140); and
(X) using the aligned data of step (IX) to compute an estimate of the gravity-free shape of the flexible object (140).

In accordance with a third aspect, a method for obtaining an estimate of the gravity-free shape of a flexible object (140) is disclosed which includes:
(I) supporting the flexible object (140) on a plurality of height adjustable pins (110);
(II) adjusting the heights (114) of the adjustable pins (110) by iteratively:
 (A) measuring the weight (112) of the flexible object (140) at each pin (110); and
 (B) adjusting the heights (114) of the pins (110) based on the measured weights; and (III) terminating the iteration of step (II) when the number of iterations, the measured weights, and/or the changes in the heights satisfy one or more predetermined criteria; wherein:

(i) the heights (114) of the pins (110) are an estimate of the gravity-free shape of the flexible object (140); and (ii) a least squares minimization procedure is used to transform the measured weights of step (II)(A) to the height adjustments of step (II)(B).

The reference numbers used in the above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

The legends in FIGS. 5-8 and 10-11 are in millimeters.

DETAILED DESCRIPTION

As discussed above, the present disclosure relates to bed-of-nail (BON) techniques for determining gravity-free shapes for flexible objects. For ease of presentation, the following discussion often refers specifically to glass sheets (or glass substrates), it being understood that the invention is not limited to glass sheets/substrates but can be used with any flexible object for which knowledge of the object's gravity-free shape is desired.

Figure 1:
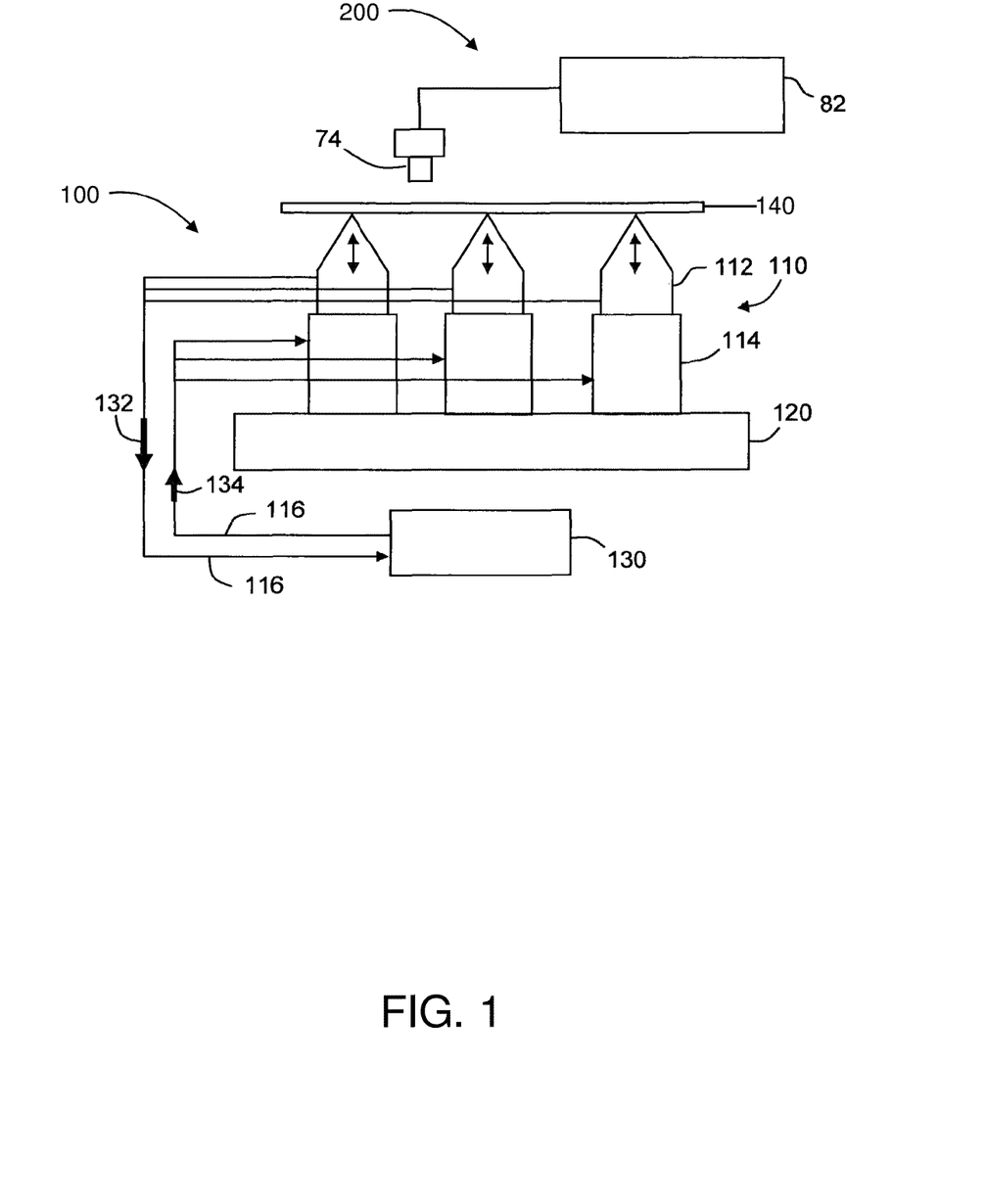
FIG. 1 is a schematic drawing of an embodiment of a measurement system employing a BON gauge and a second gauge having a finer spatial resolution than the BON gauge.

FIG. 1 is a schematic diagram showing an embodiment of a BON measurement system 100 (also referred to herein as a "BON gauge") which can be used in the practice of the present disclosure. In this system, the sheet is supported from underneath by a grouping of pins. The pins are capable of vertical movement and can measure the supported force from the sheet. The travel of each pin may also be measured.

More particularly, BON gauge 100 may include a plurality of pins 110, a gauge base 120, and a processor 130. A flexible object serves as the measurement subject 140, which in FIG. 1 is depicted as glass substrate 140. The substrate 140 rests on top of the plurality of pins 110, and as the measurement subject 140 flexes under gravity, each pin 110 bears a specific weight. Each pin 110 includes a load cell 112 to measure the specific weight supported by the pin 110. The load cell 112 may be mounted on top of a height adjuster 114, which is a device, preferably motorized, that adjusts the height of the pin 110 in a known manner. Other arrangements are conceivable, such as having the load cell 112 underneath, and accounting for the weight of the height adjuster 114.

Each load cell 112 may transmit to processor 130 via connecting lines 116 measurement signals 132 relating to the measured pin force, and the processor 130 then may perform an algorithm (see below) to calculate the necessary height adjustments for each pin 110. The processor 130 may transmit adjustment signals 134 to each height adjuster 114 via connecting lines 116 to execute the calculated height adjustments.

As shown in FIG. 1, in certain embodiments, the overall measurement system may include a second measurement system 200 (also referred to herein as a "second gauge") which may have a finer spatial resolution than the BON gauge. In particular, second gauge 200 may have a finer spatial resolution than the smallest spacing between any two pins 110. Gauge 200 can include a sensor head 74 which is scanned relative to substrate 140 and a controller 82 which controls the movement of the sensor head and receives measurement data from the sensor regarding the shape of the substrate. Typically, especially for large substrates, scanning will involve moving sensor head 74 while holding substrate 140 stationary, although the substrate can be moved relative to the sensor head or both the substrate and the sensor head can move if desired. Gauge 200 may comprise, for example, a laser displacement sensor, although other devices known in the art for measuring distances can be used if desired. Laser devices may include simple laser ranging devices, or more elaborate devices, such as, for example, a Michelson interferometer. A suitable sensor, for example, is the LT8110 confocal laser displacement sensor sold by Keyence Corporation of America (Woodcliff Lake, N.J.). Other manufacturers of suitable sensors include Micro-Epsilon of Raleigh, N.C. (e.g., the second gauge can comprise a Micro-Epsilon Chromatic Confocal Displacement Sensor carried by an Aerotech, Inc. (Pittsburgh, Pa.) gantry).

In overview, the BON measurement system operates by adjusting the heights of the pins until each pin supports a specified target weight. The target weights are determined by performing a stress analysis for the glass sheet when supported on the pins, e.g., a finite element stress analysis using commercially available software such as that sold by ANSYS, Inc. (Canonsburg, Pa.). When all the pins are at their specified weights, they are supporting the particular substrate in its gravity-free shape. The vertical heights of the pins at this point provide an estimate of the gravity-free shape of the substrate, the spatial resolution of the estimate being determined by the spacing between the pins. If an estimate with a finer spatial resolution is desired, the shape of the substrate while being held in its gravity-free configuration by the adjustable pins may be measured using the second gauge to scan the substrate surface and measure the heights over the entire surface, at and between the pins. The measurements using the second gauge can then be corrected by subtracting the sag pattern that would exist between the pins for a perfectly flat sheet having substantially the same location on the pins (e.g., the nominal location) and having substantially the same dimensions and mechanical properties as the sheet that was measured.

Figure 2:
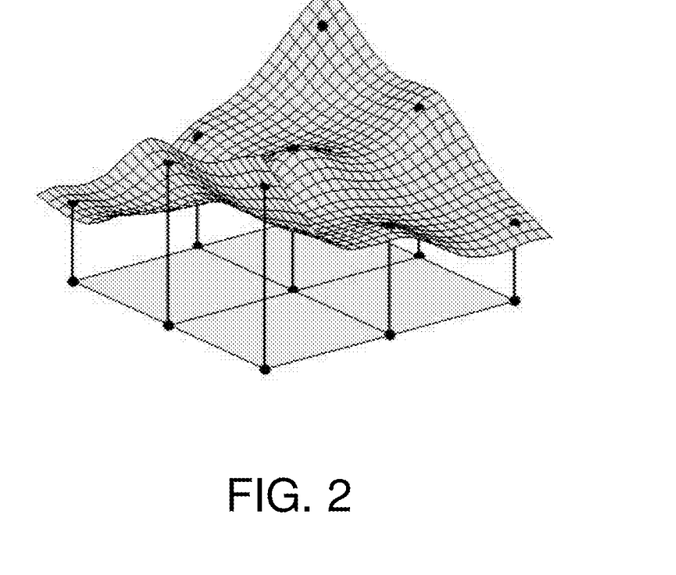
FIG. 2 is a 3D plot of a measured shape obtained using a BON gauge and a second gauge having a finer resolution.
Figure 3:
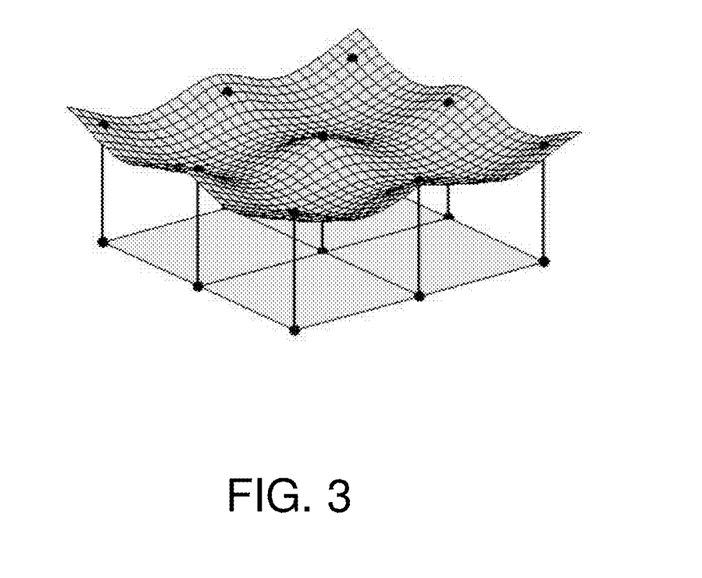
FIG. 3 is a 3D plot of a theoretical sag pattern calculated for a flat sheet when placed on a pin array with the same spacing and measured with a second gauge on the same points on the sheet as in FIG. 2.
Figure 4:
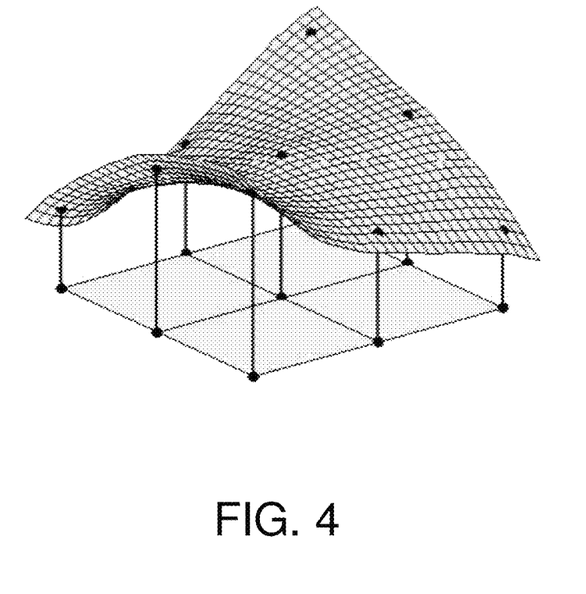
FIG. 4 is a 3D plot of estimated gravity-free sheet shape calculated by subtracting the theoretical sag illustrated in FIG. 3 from the data in FIG. 2. The resulting shape shows little evidence of sag between the pins and varies smoothly.

More particularly, in one embodiment, the gravity-free shape of a flexible object can be estimated using, for example, the following flow chart, which can, for example, be practiced in combination with the generic elements of the flow charts of FIGS. 2 and 3 and the computer system of FIG. 4 of U.S. Pat. No. 7,509,218:

1.0 Pre-calculations for a sheet of known dimensions and mechanical properties
  1.1 Pre-calculate target weights to account for sheet overhang using, for example, a finite element analysis; typically, the analysis assumes that the sheet is of the correct size, has a uniform thickness and uniform mechanical properties, and is put on the pins so that the overhang is the same on all sides (the nominal location of the sheet); if desired, one or more of these assumptions can be relaxed, e.g., pre-calculated target weights can be calculated for each sheet that is to be measured based on the sheet's actual alignment on the pins.
  1.2 Pre-calculate the sag pattern of a perfectly flat sheet having the nominal dimensions and mechanical properties of the sheet to be measured and the nominal location on the pins using, for example, a finite element analysis.
  1.3 Pre-calculate a "forward" matrix $E_{kj}$ which connects the change in weight $\Delta W_k$ of the kth pin with a change in height $\Delta h_j$ of the jth pin.
  1.4 Pre-calculate an "inverse" matrix $G_{jk}^{-1}$ using a least squares minimization technique which estimates the smoothest set of pin moves $\Delta h_j$ which will minimize the sum of squares of the target weight errors.
2.0 Iterate the pin heights until the pin weights differ from the target weights by a predetermined amount, and/or the maximum change in pin height is less than some predetermined amount (e.g., one micron for a glass substrate), and/or until a predetermined number of iterations have been completed.
  2.1 At each iteration i, $h_j(i)=h_j(i-1)+\Delta h_j=h_j(i-1)-g*G_{jk}^{-1}\Delta W_k$, where "g" is a gain parameter which normally is less than 1.0; the use of a gain parameter less than 1.0 has been found to improve the measurement's sensitivity to thermal stress in a sheet; with a gain equal 1.0, the system may not find the thermal stress initially; a gain parameter equal to 1.0 (or greater than 1.0) can, of course, be used if desired.
3.0 Scan the shape of the sheet with the second gauge to obtain measurement data for the sheet shape on a finer spatial scale than the pin spacing.
  3.1 From the gauge measurement of Step 3.0, subtract the calculated sag pattern from Step 1.2 to get the estimated shape.

The pre-calculation of the target weights of Step 1.1 is performed in a manner similar to that used in U.S. Pat. No. 7,509,218. Since the size (width/length/thickness) of the sheet is known and the locations of the array of BON pins is also known (N_x×N_y and pin spacing), the theoretical weight for a perfectly flat sheet of the known size can be calculated using, for example, the commercial ANSYS® finite element software referred to above. This gives a target weight $F_k$ for each of the k pins.

As discussed above, in certain embodiments, the overall shape measuring system can incorporate a second gauge (e.g., a laser gauge) to measure the sheet shape after all pins are in their final position and thereby provide a more detailed measurement of the sheet shape. This measurement will contain not only the gravity-free shape of the sheet, but also the sag between the pins.

The pre-calculated sag pattern of Step 1.2 provides a mechanism for separating these two contributors to the shape measured by the second gauge. Specifically, the pre-calculated sag pattern of Step 1.2 provides an inter-pin shape for the particular pin spacing and flexible object being measured which can be subtracted from the overall measurement to leave the desired gravity-free shape. It should be noted that to avoid problems associated with subtracting two numbers which have similar magnitudes, the pins should be close enough together so that the calculated inter-pin sag pattern is moderate, i.e., not too large relative to the sag pattern of the object which is to be measured by the second gauge. In the case of glass substrates, for a given pin spacing, the amount of inter-pin sag will depend primarily on the thickness of the glass, with the glass' stiffness (Young's modulus) playing a secondary role.

The pre-calculated sag pattern $S_{mn}=S(x_m,y_n)$ of Step 1.2 is for a perfectly flat sheet. This sag solution can, for example, be obtained at the same time the analysis of Step 1.1 is being performed (e.g., using the same software package as used for Step 1.1). The sag pattern pre-calculated in Step 1.2 is used in Step 3.1 to "eliminate" the sag between the pins which a flat sheet would have. In particular, the pre-calculated sag pattern for the flat sheet is subtracted from the sag pattern measured by the second gauge. Such subtraction is unnecessary if the only shape information used is the pin heights, because there is no sag right at the pins. In order for the subtraction to be effective, the sag solution needs to be calculated at (or interpolated to) the fineness of the grid which will be measured by the second gauge. Hence, in certain embodiments, Step (1.2) can have two parts: Step (1.2a) which obtains a sag solution and Step (1.2b) which interpolates the solution to the measurement grid of interest.

In a manner similar to that used in U.S. Pat. No. 7,509,218, Step 1.3 pre-calculates the "forward" matrix $E_{kj}$ which connects the change in weight of the kth pin $\Delta W_k$ with the change in height of the jth pin $\Delta h_j$:

$$\Delta W_k = \sum_j E_{kj} \Delta h_j$$

With the target weights $F_k$, "pin matrix" $E_{kj}$, and sag matrix $S_{mn}$ in hand, the next steps involve moving the k pins up or down so that they all bear substantially the correct target weight. This is done iteratively to get the pins' positions and final weights as accurate as possible. The use of an iterative procedure is justified for a number of reasons including: (a) at each iteration, the measured weights on the pins and the pin heights have small errors; (b) in adjusting pin heights, if too large a move is made, a pin might lose contact with the sheet, greatly complicating reaching the final "correct" result; and (c) the $E_{kj}$ matrix uses a "linear" model based on the response of a flat sheet, while the "real" effect can depend on the particular sheet shape and the position of the pins at a particular iteration; by using an iterative approach $E_{kj}$ just has to be approximately correct.

At any one iteration, the pins have heights $h_j$ and weights $W_k$. There is a weight error $\Delta W_k = W_k - F_k$. If this is negative it means the weight on pin k is low, and if it is positive the weight is high. Approximately, if the pin weight is low the height needs to be raised, but changing the height of one pin affects the neighbors.

To determine the change in height of all pins at once, i.e., to correct all weights at once, we want to solve for the unknown $\Delta h_j$ using the known weight errors $\Delta W_k$ and the $E_{kj}$ matrix—that is, we solve for $\Delta h_j$ from the equation $$\Delta W_k = \sum_j E_{kj} \Delta h_j$$

Although the matrix $E_{kj}$ is square, it cannot simply be inverted for the simple solution $$\Delta h_j = \sum_k (E_{kj})^{-1} \Delta W_k$$

This is because although there are K pins, there are really only K−3 independent columns in $E_{kj}$ or K−3 independent equations in the matrix equation. There are 3 degrees of freedom associated with the sheet remaining stationary on the pins (similar to "3 points determine a plane"). All K pins can move up with the same small height change, and the weight distribution will not change. Similarly, a small tilt in the horizontal or a small tilt in the vertical direction will change the pin heights but not the weight change (for small adjustments). Another way of saying this is that "without loss of generality" a mean plane can be fit through the sheet shape determined by the pins and the pins adjusted to make the mean plane flat at a desired height.

The previous method of handling the problem of K pins but K−3 equations was to pick 3 pins as "fixed pins" and not adjust their heights at all (since "without loss of generality" the mean plane mentioned above could be tilted to put any 3 pins at desired heights, without changing the weights on the set of K pins). These pins and the corresponding equations were eliminated from the matrix equation, so that it became an equation for (K−3) weight errors and (K−3) pin height adjustments, with a (K−3)×(K−3) square matrix which could be inverted.

In this prior implementation, the weight errors on the 3 fixed pins were ignored. The assumption that was made was that if the weight errors were eliminated on the other (K−3) pins, then they would be eliminated on the 3 fixed pins. In practice this was not always the case and the residual errors on the 3 fixed pins could be larger than on the other pins. For example, if the sheet size was not exactly correct, or the sheet was not exactly rectangular, or the sheet was not exactly on the pin array, it was not possible to move the pins to hit the target weights perfectly. In particular, in the case of a sheet not being perfectly centered, the previous procedure could converge to low weight errors on the moveable pins, and the 3 fixed pins would have large errors associated with the center of gravity of the sheet not being perfectly centered on the pin array.

Importantly, this problem becomes more serious for a large sheet. On a 3×3 pin array, 3/9 of the pins are fixed, and a "uniform" weight error is concentrated in ⅓ of the pins so there is roughly a factor of 3× difference. However, on a 9×9 array, 3/81 of the pins are fixed, and now there is a 27× concentration of the weight error. This is enough to affect the sheet shape and in some cases the convergence of the iteration scheme. The 3×-to-27× analysis is approximate and the exact effect depends on what is causing the inherent weight error.

As indicated in Step 1.4 above, rather than using the fixed pin approach, inverse matrix $G_{jk}^{-1}$ is obtained using a least squares minimization approach. By using such an approach, the pins more closely achieve the target weights. It should be noted that although not preferred, the fixed pin approach (or other approaches) can be used with other aspects of the present disclosure if desired.

The least squares technique achieves improved results compared to the fixed pin approach because it minimizes the weight error on all the pins. There are various ways to set up an easy-to-implement least squares technique, which will be evident to skilled persons from the present disclosure. As just one example, the procedure can minimize the function:

$$X^2 = \sum_k \left( \Delta W_k - \sum_j E_{kj} \Delta h_j \right)^2 + \lambda_a \sum_{x,y} \left( 0 - \frac{d^2 \Delta h_j}{dx^2} \right)^2 + \sum_j \lambda_b(j)(0 - \Delta h_j)^2$$

In this expression, the first term forces the changes in the pin heights to "zero" the errors in the pin weights. The second term forces the changes in the pin heights to be smooth. In particular, it includes second derivatives both with respect to x and to y. The parameter $\lambda_a$ is an adjustable parameter to determine the relative importance of fitting the data (first term) and achieving smoothness (second term). It can be thought of as being similar to the Powell criterion for a "tensioned spline" (see Dierckx, P., *Curve and Surface Fitting with Splines*, Oxford Univ. Press 1995, p. 49 equation (3.10)). The third term allows the choice of 3 "near-fixed" points and is the least squares analogue to the fixed pin approach. In the third term, the parameter $\lambda_b$ (j) is zero for all but 3 pins. Where it is zero it has no effect, and where it is nonzero it is again an adjustable parameter to determine the relative importance of fitting the data (first term) and forcing 3 points to be fixed (last term). Since the first term really has only K−3 "degrees of freedom", adding the last term will bring the system to K degrees of freedom, and adding the middle term further stabilizes the numerical solution. Typical values for $\lambda_a$ and $\lambda_b(j)$ are: $\lambda_a = 0.00001$ and $\lambda_b(j._{\text{"fixed"}}) = 8$ (where it is not zero)

In terms of the matrix equation that is ultimately inverted, the first term is associated with the matrix $E_{kj}$, the second term is associated with two matrices $D1_{kk}$ and $D2_{kk}$ corresponding to x- and y-derivatives, and the last term is associated with a matrix $D_{kk}$ (all matrices are square). An augmented matrix can then be generated by combining all the matrices into a single k×4k matrix $$G_{k+k+k+k,j}[E_{kj} D_{kk} D1_{kk} D2_{kk}]$$

The "data" now looks like $Z_{k+k+k+k} = [\Delta W_k 0_k 0_k 0_k]$ where $0_k$ is a vector of zeroes.

The equation $Z_{k+k+k+k} = G_{k+k+k+k,j} \Delta h_j$ can be solved by singular value decomposition (see Press et al., *Numerical Reci-*

*pes: The Art of Scientific Programming*, Cambridge Univ. Press 1986 [Chapter 2.9 Singular Value Decomposition]), saving only the kth larger components. The pseudo-inverse matrix $G_{jk}^{-1}$ is calculated (as part of the pre-calculation Step 1.0 above) and will give the desired change in pin height by the equation $$\Delta h_j = \sum_k G_{jk}^{-1} \Delta W_k$$

Although this equation has the same form as the prior approach, because $G_{jk}^{-1}$ is based on the least squares minimization, the pin adjustment process using this equation converges to a solution that reduces the weight error on all the pins.

For some applications, an estimate of the gravity-free shape of the flexible object (e.g., flexible sheet) obtained using measurements made on only one side of the object may be adequate. In other cases, however, it may be desirable to flip the object over and perform another set of measurements on the opposite side. For example, by measuring the two sides (hereinafter referred to as the "A-side" and the "B-side") and verifying that the two gravity-free shapes agree, the gauge becomes self-validating. As just one example, a 1500×1850×0.70 mm sheet was measured using 99 pins on an 9×11 grid with 175 mm pitch. The A-side and B-side results agreed with a standard deviation of 27 microns. For comparison, the difference between the maximum and minimum of the shape of this sheet was 7.6 mm.

The two sided measurement approach can be put into practice using, for example, the following flow chart, where the numbering of the steps continues from the flow chart set forth above:

4.0 Perform Steps 2.0, 2.1, and 3.0 (but not Step 3.1) for A-side and B-side.

4.1 After aligning the B-side shape so that it agrees pointwise with the A-side shape, compare the A-side shape to the B-side shape as follows:

4.1.1 The average SHAPE is defined as (A+B)/2.

4.1.2 The average ESTIMATED SAG is defined as (A−B)/2.

4.1.3 The average RESIDUAL is defined as (A−B)/2≤calculated sag from Step 1.2. Note the RESIDUAL is the same as:

½{(A-calculated sag)−(B-calculated sag)}

4.1.4 Calculate SIGMA=standard deviation (RESIDUAL), and RANGE_RESIDUAL=|max−min| (RESIDUAL), and RANGE_SHAPE=|max−min| (SHAPE)

4.1.5 The signal to noise (SNR) metric is then:

SNR=RANGE_SHAPE/RANGE_RESIDUAL.

The above flow chart assumes that Step 3.1 is not performed. If desired, Step 3.1 can be performed with the alignment of Step 4.1 and/or the comparison parameters of Steps 4.1.1 through 4.1.5 being adjusted as necessary to take account of the use of this step.

The accuracy of the gauge can be assessed by looking at SNR and SIGMA. If SNR>10, it becomes difficult to visually distinguish A-side shape from B-side shape, and if SNR>40 it is extremely difficult—one typically needs a contour plot of RESIDUAL to see any differences. If the SNR is not high enough, the A-side or B-side measurement can be repeated to verify that the gauge repeatability is itself adequate.

In Step 4.1, the A-side and B-side measurements are aligned so that the same physical points on the sheet, with the same vertical orientation for the sheet's shape, are compared. If, for example, the A-side is taken as the reference and the B-side corresponds to flipping the sheet about an axis that is parallel to the y-axis of the BON and passes through the middle of sheet, the alignment can be expressed mathematically as: aligned_sagB(x,y)=−measured_sagB(−x,y). Corresponding expressions can be obtained for other relationships between the A-sides and B-sides of the sheet, e.g., flipping about an axis parallel to the x-axis of the BON, flipping combined with translating of the sheet, and the like.

It should be noted that the ESTIMATED SAG can be monitored to confirm that the flipping has been done in the expected manner. It should be further noted that as a result of the flipping, a given portion of the sheet is supported by different pins during the A-side and B-side measurements. Consequently, the overall procedure involves two sets of independent shape measurements, which allows for a high sense of confidence in the reliability of the measurement. For comparison, performing multiple measurements using the same pin for the same portion of the sheet for each measurement does not provide the same level of confidence in the measurement's reliability since a faulty pin will provide the same error each time which may be difficult to detect in the data.

For large sheets, the sheet can adopt a tilt which exceeds the maximum travel range of the pins on the high side of the sheet. To avoid this problem, after each iteration, the mean plane of sheet can be adjusted to be substantially horizontal and located at, for example, the middle of the range of travel of the pins. Depending on the maximum travel of the pins, such an adjustment may not be necessary for small sheets.

The mathematical procedures described above can be readily implemented using a variety of computer equipment and a variety of programming languages or mathematical computation packages such as MATHEMATICA (Wolfram Research, Champaign, Ill.), MATLAB (MathWorks of Natick, Mass.), or the like. Output from the procedures can be in electronic and/or hard copy form, and can be displayed in a variety of formats, including in tabular and graphical form. For example, graphs, including topographical graphs, can be prepared using commercially available data presentation software such as MICROSOFT's EXCEL program or similar programs. Software embodiments of the procedures described herein can be stored and/or distributed in a variety of forms, e.g., on a hard drive, diskette, CD, flash drive, etc. The software can operate on various computing platforms, including personal computers, workstations, mainframes, etc.

Without intending to limit it in any manner, the invention will be further illustrated by the following examples.

Example 1

This example illustrates the usefulness of employing a second gauge to perform a scan at a higher resolution than the pin spacing, as well as the value of adjusting the measurement data to account for the sag between the pins. In this example, the measurement data is adjusted by subtracting the theoretical sag.

FIG. 2 shows the results of measuring the shape of a 600 mm×600 mm×0.70 mm sheet of glass using a BON system having 9 pins arranged in a 3×3 array with a 250 mm spacing. The figure shows the actual heights of the 9 pins after they have been moved to adjust the measured weights to agree with the target values, along with the shape data from a laser scan done on a 20 mm grid spacing. The only information from the pin data alone is the height of the pins. It should be noted that the vertical scale in this figure (as well as in FIGS. 3, 4, and 9) is finer than the horizontal scales so as to better visualize the shape of the sheet.

The theoretical sag between the pins for a flat sheet the same size as the sample and having the same material properties (density, Young's Modulus, Poisson's Ratio) was calculated in ANSYS and interpolated to the same mesh as the scan measurement in FIG. 2. This calculated sag is shown in FIG. 3 with the theoretical position of the 9 pins included for reference.

The theoretical sag of FIG. 3 was then subtracted from the measured data of FIG. 2. The result is show in FIG. 4. The sag effect is removed and what is now seen is a detailed scan of the full sheet at a higher resolution than that obtainable from the 9 data points from the pins alone.

In practice, the shape data obtained using the second gauge can be fit with, for example, a 21-parameter $5^{th}$ order polynomial in x and y (including terms from $x^5$ to $y^5$ with all mixed terms like $x*y^4$, etc.). Specifically, such fitting can be done for a second gauge whose measured grid is 30×30 so there are 900 points for a least-squares fitting to the 21-parameter $5^{th}$ order polynomial. For comparison, the 9 data points from the pins alone will exactly fit a $3^{rd}$ order polynomial in x and y. As will be evident, the $5^{th}$ order fit provides a much better characterization of the sheet shape than the $3^{rd}$ order fit.

Example 2

This example illustrates an alternate to the theoretical sag approach for correcting for the sag between the pins.

Figure 5:
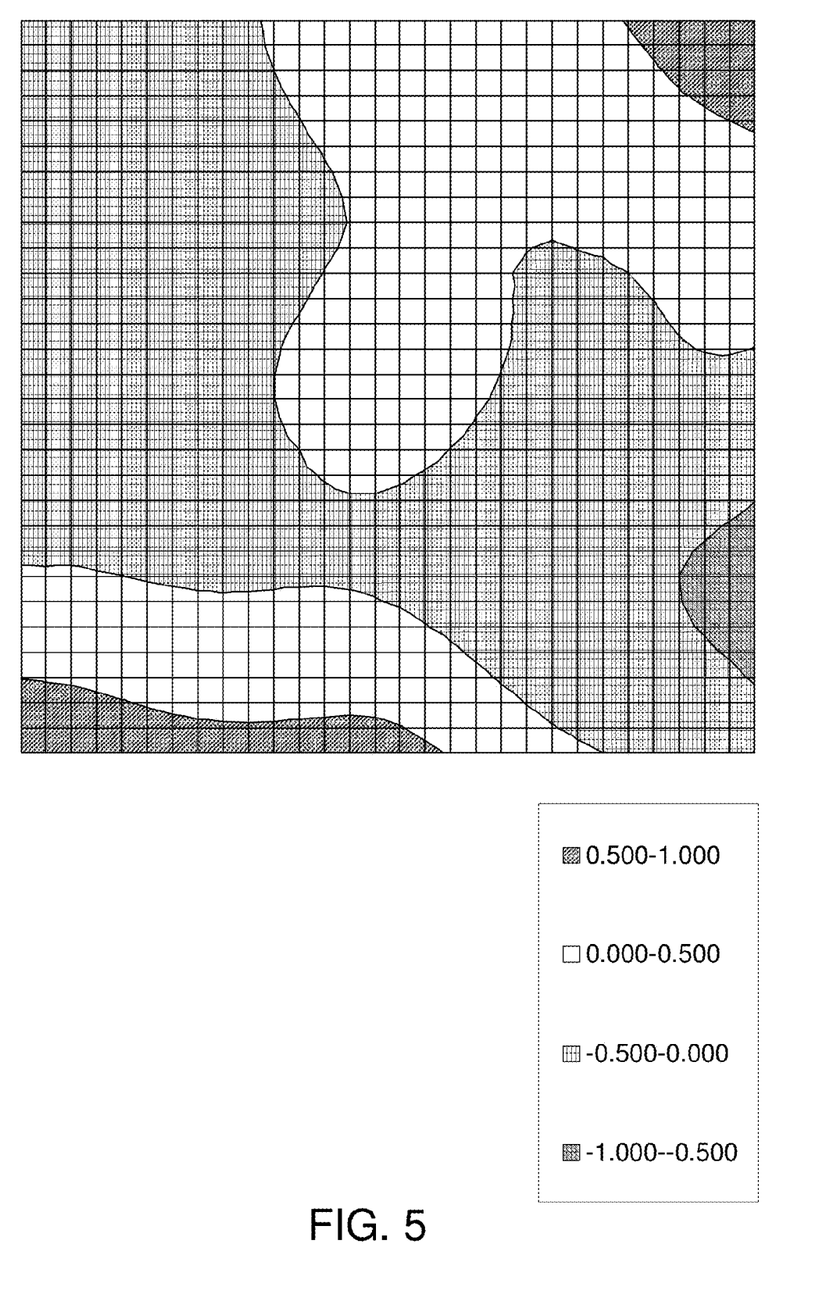
FIG. 5 is a 2D contour plot of an A-side shape.
Figure 6:
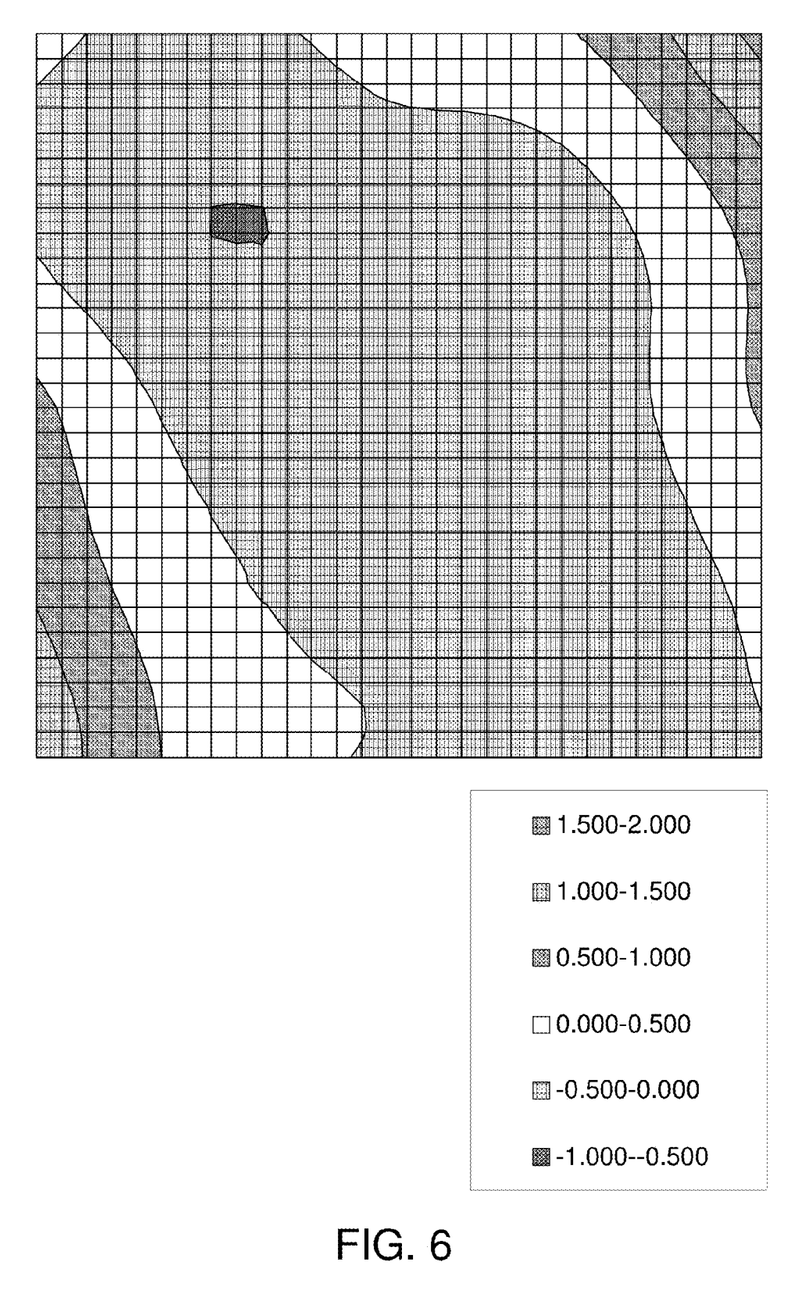
FIG. 6 is a 2D contour plot of a B-side shape.
Figure 7:
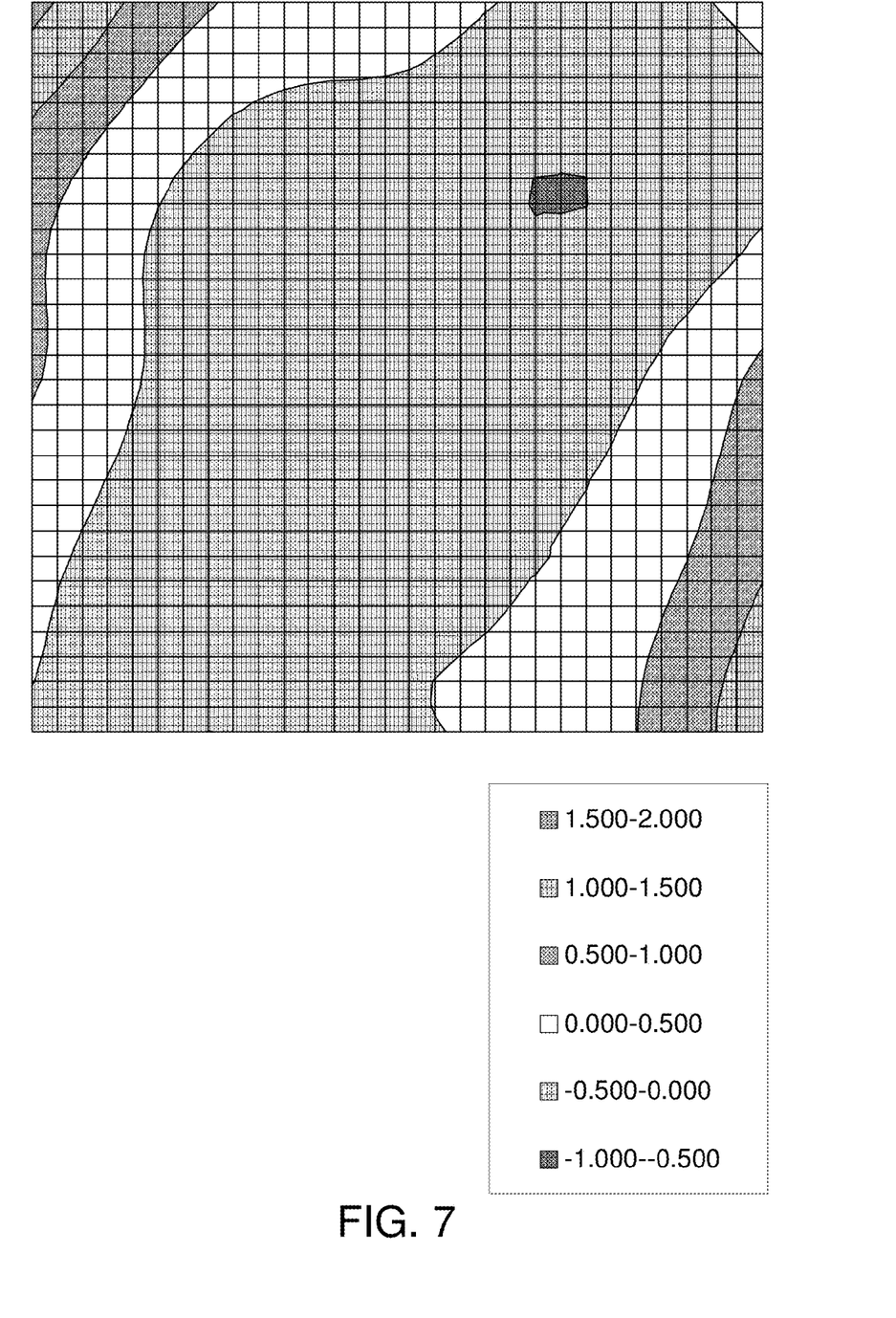
FIG. 7 is a 2D contour plot of the B-side shape of FIG. 6 after mirror-reflection.

FIG. 5 is a 2D contour plot of the measured shape data plotted in FIG. 2, i.e., like the data of FIG. 2, the data of FIG. 5 does not include sag correction. For reference, this data will be referred to as the "A-side" data. FIG. 6 is a 2D contour plot of measured data obtained when the sheet was flipped over and measured on the reverse side (the "B-side" data). FIG. 7 shows the data from FIG. 6 "mirror-reversed" so that the x-y grid corresponds to the same points in space as used for the A-side measurement.

Figure 8:
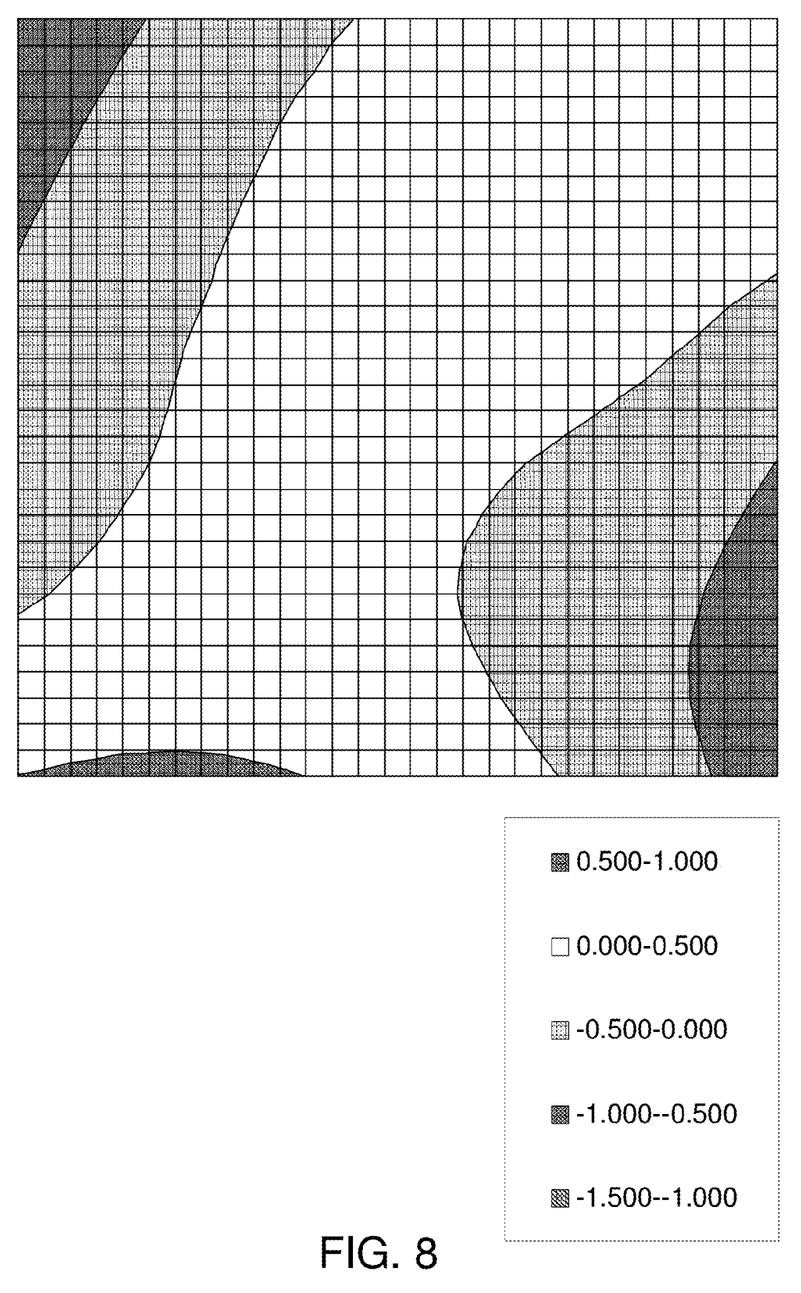
FIG. 8 is a 2D contour plot of (A+B)/2 after mirror-reflecting and inverting the B-side shape.

FIG. 8 shows the result of (1) inverting the data of FIG. 7 (the resulting mirror-reversed and inverted data is the "aligned data" for this example), (2) adding the aligned data to the data of FIG. 5, and (3) dividing by two, i.e., FIG. 8 shows (A+B)/2 where the B-data has been mirror-reversed and inverted (i.e., aligned) before being combined with the A-side data. This process averages the A-side shape and B-side shape (reflected and inverted to resemble A-side) and the sag cancels out, giving an estimate of the shape without subtracting a theoretical sag as in Example 1.

Figure 9:
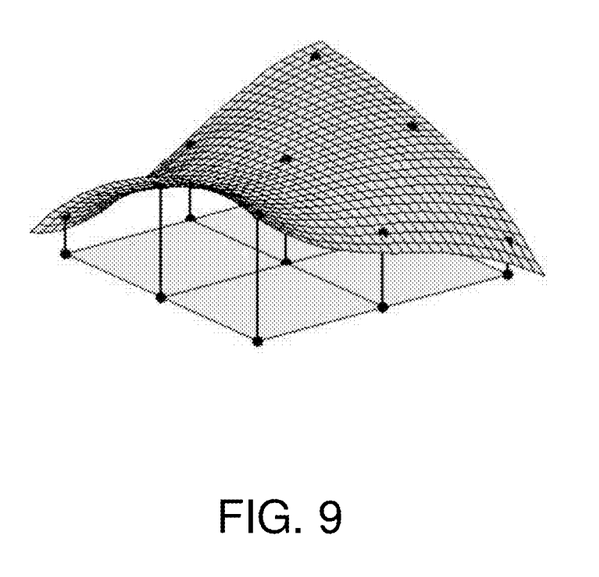
FIG. 9 is a 3D plot of the (A+B)/2 data of FIG. 8.

FIG. 9 shows the data from FIG. 8 (2D contour plot) in a 3D format like the Example 1 plots. As can be seen, the FIG. 9 plot based on the (A+B)/2 calculation is very similar to the corresponding FIG. 4 plot generated by subtracting the theoretical sag. Thus, there are two different ways of getting the desired gravity-free shape, both of which enjoy the benefits of the higher resolution of the scan with the second gauge. If desired, a residual can be defined by taking the difference between the two approaches (see below).

Figure 10:
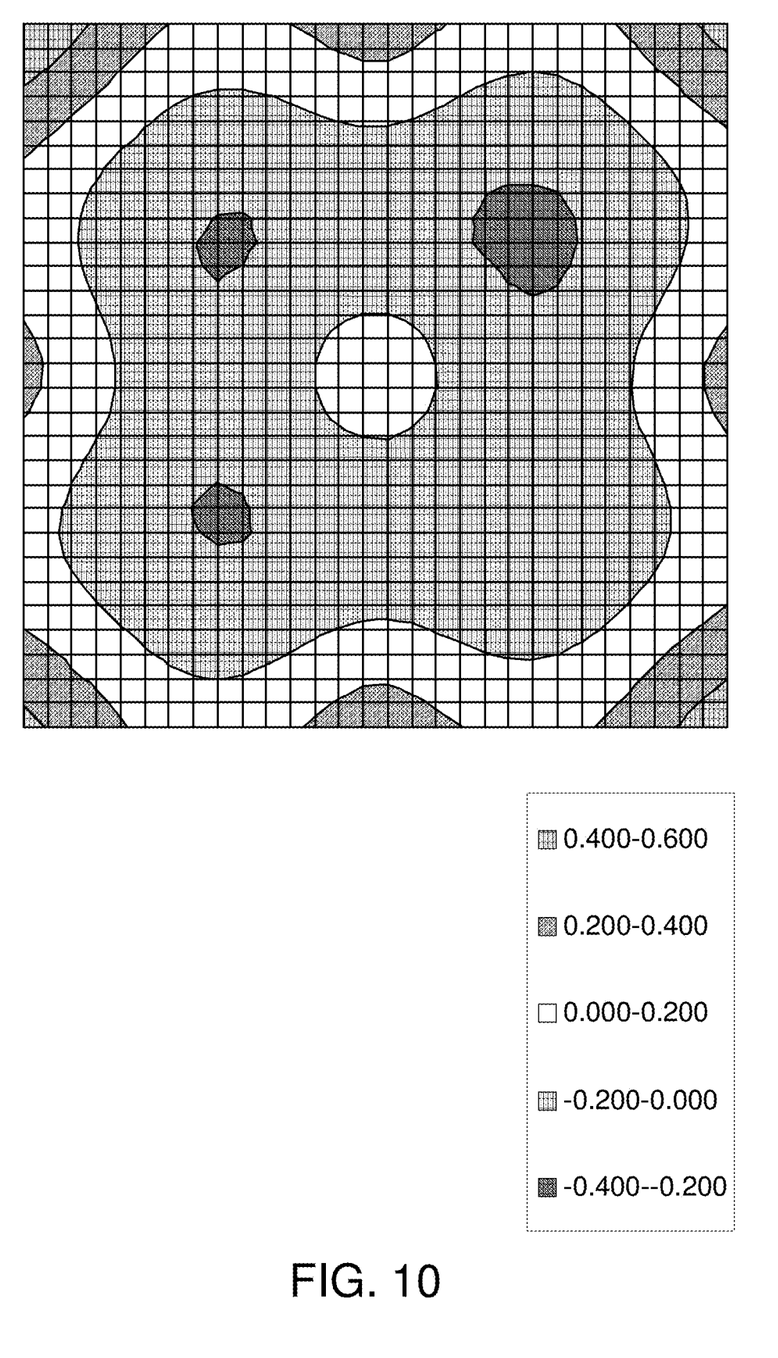
FIG. 10 is a 2D contour plot of (A−B)/2 after mirror-reflecting and inverting the B-side shape. (A−B)/2 estimates the calculated sag.
Figure 11:
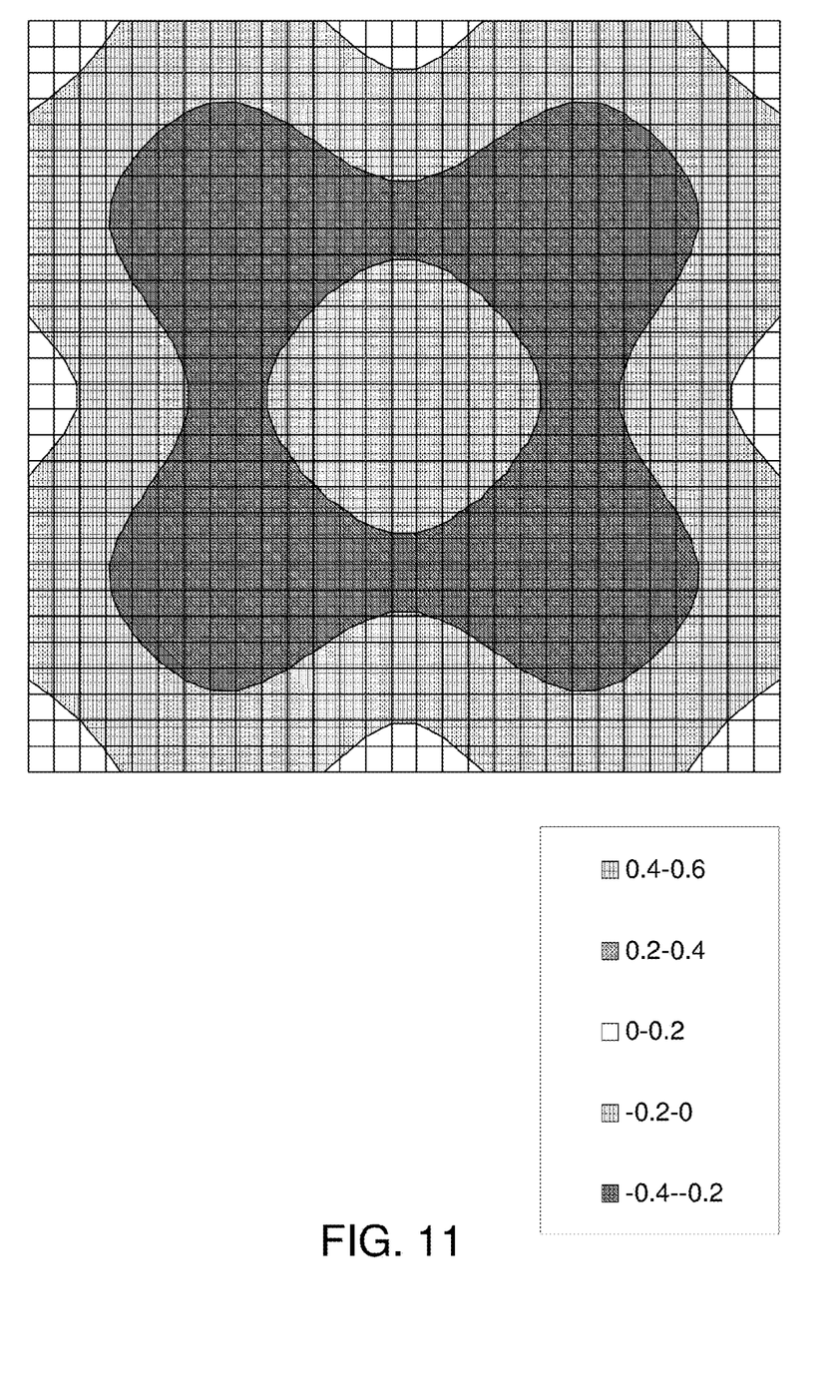
FIG. 11 is a 2D contour plot of the calculated (theoretical) sag of FIG. 3.

An estimate of the gravity-sag can be obtained from the measurement data alone by computing (A−B)/2, where again the B-side data is mirror-reflected and inverted. FIG. 10 shows the results of such a calculation. For comparison, FIG. 11 is a 2D contour plot of the theoretical sag of FIG. 3. As can be seen, FIGS. 10 and 11 are similar as expected.

Metrics to estimate the accuracy of the measurement technique can be constructed by comparing how well the A-side and B-side measurements agree with each other after subtracting sag. A residual can defined as this difference or the difference between the (A−B)/2 sag estimate and the theoretical sag (here "B" is the mirror-reflected and inverted B-side shape which agrees with A, so that the estimate of the shape is B+sag_theory). For example, the residual can be defined as:

$$R = \frac{(A-B)}{2} - sag_{theory} = \frac{(A - sag_{theory}) - (B + sag_{theory})}{2}$$

A signal-to-noise metric SNR can be defined as the ratio of the |max−min| of the (A+B)/2 shape to the |max−min| of the residual R:

$$SNR = \frac{|\max - \min|\{(A+B)/2\}}{|\max - \min|(R)}$$

This metric allows one to validate the measurement without any external reference except the theoretical sag calculation.

Example 3

This example illustrates the benefit of using the least squares minimization procedure for optimizing pin heights to achieve target weights as compared to the method of holding 3 pins fixed and "inverting" a matrix to achieve the target weight on N−3 pins.

Figure 12:
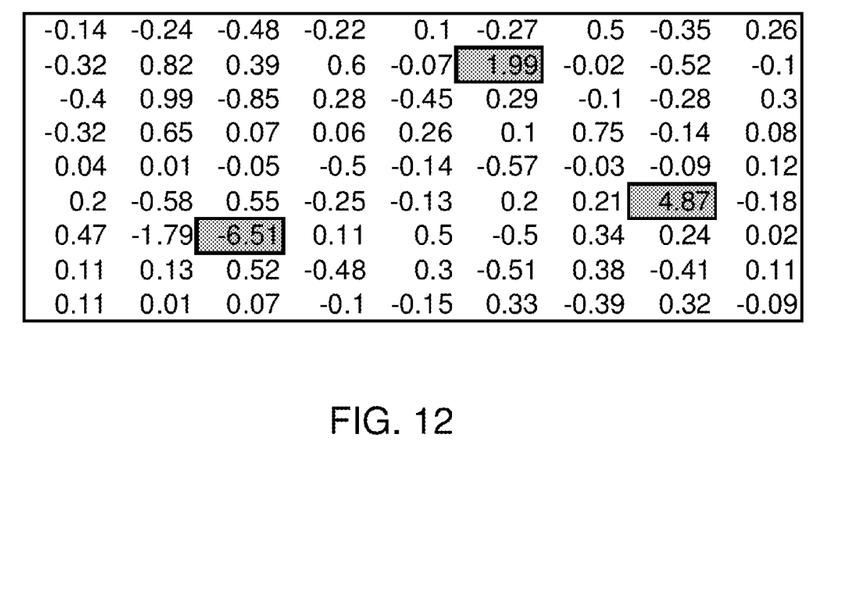
FIG. 12 is a chart showing weight error versus pin position for the fixed pin procedure for adjusting pin heights.

The measurements were made on 1440 mm×1565 mm×0.70 mm sheets using 81 pins in a 9×9 array, spaced at 175 mm. FIG. 12 gives the weight errors in grams on all 81 pins for a measurement made using the fixed pin approach. The 3 fixed pins are shaded.

The errors are relatively small on all pins except the 3 fixed pins. The most likely explanations for the large error on the 3 fixed pins is that the sheet is not perfectly aligned on the pins and/or that the dimensions of the sheet are not exactly 1400× 1565. This is suggested because the sum of the weight errors of the fixed pins is approximately zero and the "left-right" and "top-bottom" sums approximately balance. This is typical of all measurements done with the fixed pin method, even with the small 3×3 array used in Examples 1 and 2.

Figure 13:
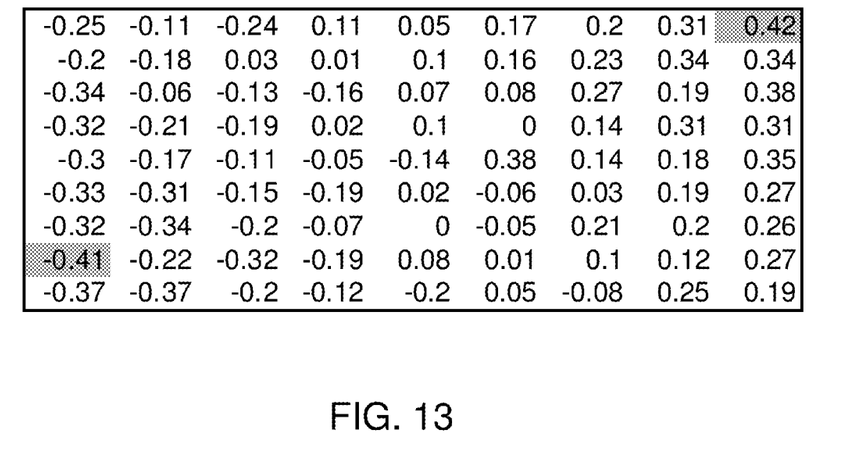
FIG. 13 is a chart showing weight error versus pin position for the least squares minimization procedure for adjusting pin heights.

FIG. 13 gives the weight errors in grams for a measurement on the same size sheet using the least squares minimization procedure disclosed herein. The pins with maximum and minimum weight error values are shaded. These are reduced by approximately a factor of 10 from the FIG. 12 errors; this is because the error due to alignment and/or sheet size is not concentrated in 3 pins, but has been spread over 99 pins.

The data of FIGS. 12 and 13 are representative of the types of improvements achieved by the least squares minimization procedure and show that shifting to this procedure gives a step change reduction in the magnitudes of the weight errors compared to those of the fixed pin approach.

From the foregoing, it can be seen that the present disclosure provides methods and apparatus for estimating the gravity-free shape of flexible objects such as the glass sheets used as substrates in the manufacture of display devices. The methods and apparatus are particularly well-suited to the measurement of large sheets, although they can be used with smaller sheets if desired. Importantly, they can be configured to provide quantitative estimates of the accuracy of the gravity-free determination.

Among other things, the gravity-free shapes provided by the methods and apparatus disclosed herein can be used as input to models for predicting other measurements like full sheet warp or 2D-stress. In this way, further understandings can be achieved as to why a particular sheet gave a particular full sheet warp or 2D stress profile. Along these same lines, the measured gravity-free shapes can be compared to the output from a model predicting sheet shape resulting from particular settings of a glass manufacturing line. By comparing the actual shape to the predicted shape, the cause of certain features of the shape can be identified and process changes made to address them. Or, if a particular sheet shape is desired, process changes to achieve that sheet shape can be achieved.

As other possible applications, the methods and apparatus disclosed herein can be used as input to a model to predict "chuckability" or robustness of a glass sheet in downstream processes, e.g., processes that apply coatings and/or electronics to a sheet during the fabrication of such products as liquid crystal displays. For example, PCT Patent Publication No. WO 2009/108302 referred to above discusses the use of Gaussian curvature calculated from a gravity-free shape as a measure of the "chuckability" of a glass sheet in such processes. Curvature, including both mean curvature and Gaussian curvature, involves calculating second derivatives of a sheet's shape. The detailed information regarding sheet shape provided by the use of a second gauge is particularly helpful in calculating these derivatives so as to obtain reliable curvature information. The derivatives can, for example, be obtained using a polynomial fit to the second gauge data.

A variety of modifications that do not depart from the scope and spirit of the invention will be evident to persons of ordinary skill in the art from the foregoing disclosure. For example, although the disclosure has employed pin arrays with uniform pin spacing, non-uniform spacing, e.g., a higher pin density near the edges of the sheet, can be employed if desired. Similarly, the second gauge can employ a non-uniform scan array. The following claims are intended to cover the specific embodiments set forth herein as well as modifications, variations, and equivalents of those embodiments of the foregoing and other types.

What is claimed is:

1. A method which uses weight measurements made under gravity conditions to obtain estimates of a gravity-free shape of a flexible object, said gravity-free shape being the shape the object would have if there were no gravity, said flexible object having dimensions and mechanical properties and an estimated gravity-free shape that is not perfectly flat, said method comprising:
   (I) supporting the flexible object on a plurality of height adjustable pins;
   (II) adjusting the heights of the adjustable pins by iteratively performing, for a number of iterations, the steps of:
      (A) measuring a weight of the flexible object at each pin; and
      (B) adjusting the heights of the pins based on the measured weights;
   (III) terminating the iteration of step (II) when the number of iterations, the measured weights, and/or the changes in the heights satisfy one or more predetermined criteria;
   (IV) without removing the flexible object from the pins, measuring the flexible object's shape after step (III) using a measuring system having a finer spatial resolution than a smallest spacing between any two pins;
   (V) computing an estimate of the gravity-free shape of the flexible object by subtracting a calculated sag for a theoretical object supported on the pins from the measured shape of step (IV), the theoretical object having (i) the same dimensions and mechanical properties as the flexible object and (ii) a gravity-free shape that is perfectly flat;
   (VI) flipping the flexible object and performing steps (I) through (V) on the flipped flexible object wherein the flipping causes any given portion of the flexible object to be supported by different pins from those that supported the given portion before the flipping; and
   (VII) comparing the estimates of the gravity-free shape of the flexible object computed for a non-flipped orientation and a flipped orientation.

2. The method of claim 1 wherein step (II) is performed using a least squares minimization procedure wherein none of the heights of the adjustable pins is fixed during step (II)(B).

3. The method of claim 1 wherein the measuring system having a finer spatial resolution is an optical system.

4. The method of claim 1 wherein the flexible object is a glass sheet.

* * * * *